United States Patent [19]

McAlister

[11] Patent Number: 4,851,809

[45] Date of Patent: Jul. 25, 1989

[54] TIRE INFLATION INDICATOR

[75] Inventor: Steve R. McAlister, Gadsden, Ala.

[73] Assignees: Suzanne Goggans; Carolyn J. Brown, both of Gadsden; Gene Patrick Adkison, Glencoe; Jane S. Stearns; Matthew M. Bishop, both of Birmingham; Lucy Dean Roffman, Gadsden, all of Ala. ; part interest to each

[21] Appl. No.: 268,032

[22] Filed: Nov. 7, 1988

[51] Int. Cl.[4] .............................................. B60C 23/00
[52] U.S. Cl. .................... 340/442; 73/146.5; 116/34 R; 116/34 A; 200/61.22
[58] Field of Search ................. 340/58; 73/146-146.8; 116/34 R, 34 A, 34 B; 200/61.22-61.26

[56] References Cited

U.S. PATENT DOCUMENTS

| | | | |
|---|---|---|---|
| 3,787,806 | 1/1974 | Church | 116/34 R |
| 4,318,436 | 3/1982 | Shurman | 116/34 A |
| 4,601,254 | 7/1986 | Huang et al. | 116/34 R |

FOREIGN PATENT DOCUMENTS 0188208  8/1986  Japan ................................ 116/34 A

*Primary Examiner*—Donnie L. Crosland
*Attorney, Agent, or Firm*—Jennings, Carter, Thompson & Veal

[57] ABSTRACT

A tire inflation indicator is integrated into the sidewall of a tire to give a visual indication of proper pressurization. A small lamp is imbedded in the sidewall and is electrically connected through the sidewall to a pneumo-mechanical switch and battery. The switch connects the battery to the lamp when the tire pressure falls below a predetermined level.

12 Claims, 1 Drawing Sheet

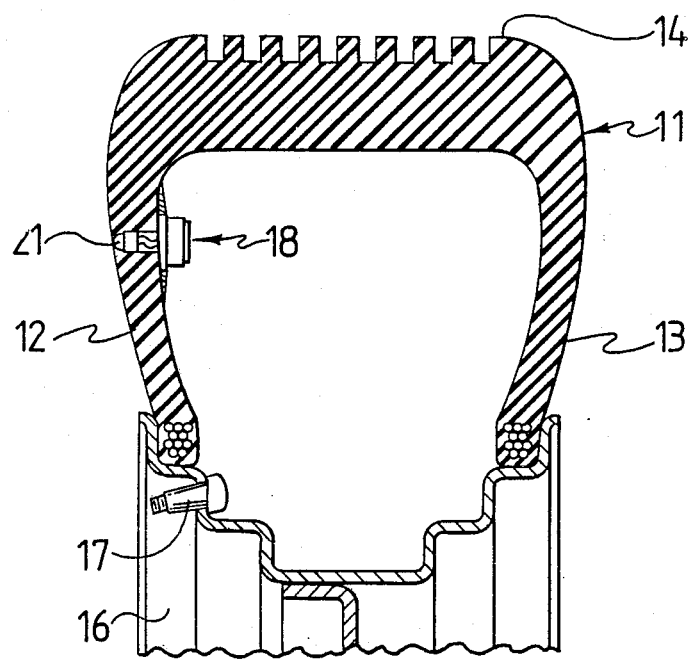
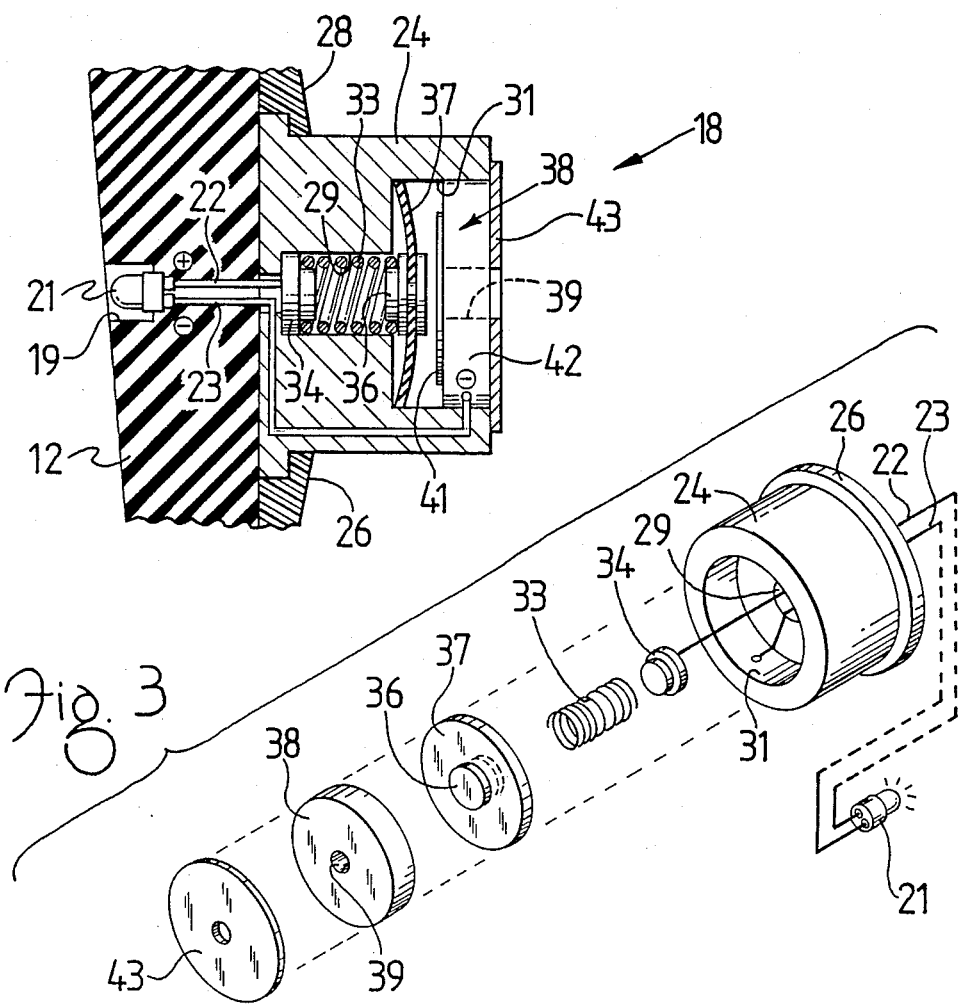

TIRE INFLATION INDICATOR

FIELD OF THE INVENTION

The present invention relates to pneumatic tires such as automobile tires and the like and particularly to means for easily determining the proper inflation thereof.

BACKGROUND OF THE INVENTION

A need is perceived for inflation indicators on personal automobile tires. This need is evidenced by the increasing number of personal automobiles and the increasing variation of tire sizes, shapes and styles. In the not too distant past a casual observer might note that a tire looked slack and suggest adding more air to the tire, however today that some observer might be confused by whether the tire was a G78 or G70 series or whether the tire was a radial or bias ply tire. In other words, a casual look is no longer a sufficient measure of tire inflation. Furthermore, an increasing number of drivers are not inclined to check their tires for proper inflation. Under-inflated tires become excessively worn more rapidly than properly inflated tires and degrade the automobile's handling characteristics, therefore improper inflation has long been recognized as a safety problem. Numerous attempts have heretofore been made to produce an inexpensive yet reliable inflation indicator. Various devices are known which modify or incorporate the valve stem of a tire to indicate tire pressure. Within this category are found U.S. Pat. Nos. 2,554,594; 3,453,590; 3,462,735; 3,593,268; 3,713,092; 3,859,628; 3,938,078; 4,037,192; and 4,425,558. Indicators integrated to the wheel rim include U.S. Pat. Nos. 3,508,193; 3,961,309; 4,048,614; 4,059,823; and 4,071,724. Other indicators are shown in U.S. Pat. Nos. 2,797,273; 3,787,806; and 4,550,385. This number of patents show a long-felt need which remains unanswered insofar as the marketplace is concerned. Many of these devices are complex, or require radio transmission equipment or are easily damaged and not so easily repaired, therefore it is clear that a simple, inexpensive apparatus is still needed.

SUMMARY OF THE INVENTION

The object of the present invention is to satisfy the long-existent need for an economical, efficient tire inflation indicator.

The present invention accomplishes this objective by integrating the sensor directly into the tire and by eliminating unnecessary mechanical or electronic elements found in the various prior art references. By integrating th esensor in the tire, no specialized equipment or modification to the rim or cab of the vehicle is required. Further, the basic tire is the same as an ordinary tire and thus the purchaser can obtain the benefit of my device simply by replacing his old tire with a tire with my device built in.

My device is mounted to the sidewall of a tire. The sidewall of a tire is always visible yet is protected from excessive impact and wear. Accordingly, I mount in a recess formed in the sidewall a small light which is electrically connected to a pair of wires molded into the tire. The pair of wires are attached to a battery and a pneumo-mechanical switch which senses the internal pressure of the tire and selectively connects the battery of the light responsive to the sensed pressure.

BRIEF DESCRIPTION OF THE DRAWINGS

Apparatus embodying features of my invention are depicted in the accompanying drawings which are a portion of this disclosure and wherein:

FIG. 1 is a sectional view of a tire and rim along a radius thereof showing may invention mounted to the sidewall of the tire;

FIG. 2 is a sectional view of my apparatus; and

FIG. 3 is an exploded perspective view of my apparatus.

DESCRIPTION OF A PREFERRED EMBODIMENT

Referring to the Figures for a clearer understanding of my invention, it may be seen that a tire, shown generally at 11, of the tubeless type has a pair of sidewalls 12 and 13 and a tread portion 14. The sidewalls 12 and 13 are cooperatively engaged within the flanges of a wheel rim 16 in a conventional manner and a valve stem 17 is also conventionally utilized. My invention is located on the sidewall 12 which is the outboard sidewall of the tire 11 when the tire 11 and rim 16 are placed on the vehicle.

As may be seen in FIGS. 1 and 2, my invention shown generally at 18 is affixed to and integrated with sidewall 12. On the outside of sidewall 12 a well, or recess, 19 is formed to receive therewithin a lamp 21, such as a light emitting diode. Attached to the lamp 21 are electrical conductors 22 and 23 which extend through the rubber material of the sidewall 12 to the inner surface thereof. On the inner surface of sidewall 12, I provide a pressure sensing apparatus, which provides an electrical output to the lamp 21 whenever the pressure in the tire 11 falls beneath a predetermined level, for example 30 psi.

The pressure sensing apparatus includes a casing 24 which has an axial bore therethrough and a peripheral flange 26 extending about the casing 24 proximal the sidewall 12. The flange 26 is used to attach the casing 24 to the sidewall 12 with rubber bonding material 28. The axial bore of the casing 24 has a reduced diameter portion 29 near the sidewall 12 and a larger diameter portion 31 opening away from the sidewall 12. A shoulder 32 is formed within the casing 24 at the junction of the larger and smaller diameter portions of the bore. Mounted within the smaller diameter portion 29 and extending into the larger diameter portion 31 is an electrically conductive spring 33 which rests on an electrical contact 34 placed within the bore. The contact 34 is connected to the conductor 22 such that the spring 33 is electrically connected to the lamp 21. The spring 33 abuts against a movable electrical contact 36 which is carried by a gasket 37 which forms a sealing diaphragm within the larger diameter portion 31. The spring 33 urges the diaphragm 37 and contact 36 away from the sidewall 12 and toward a battery 38 mounted within the larger diameter portion of the bore. The battery 38 has a central aperture 39 through which air can pass and a terminal 41 about the aperture. Such batteries 38 are commercially available and are commonly used to power such devices as digital watches and hearing aids. The battery 38 has an outer case which serves as a second terminal 42 and is in electrical contact with conductor 23. An apertured battery lid 43 is used to retain the battery 38 in the casing 24.

From the foregoing it may be seen that when the spring 33 urges the movable contact 36 and diaphragm 37 against the battery 38 an electrical circuit is closed, resulting in illumination of lamp 21. When the tire 11 is pressurized sufficiently the air pressure acting on the diaphragm overcomes the spring 33 and opens the circuit. It will be understood that the spring 33 may be selected such that any desired pressurization will open the circuit, therefore the spring 33 may be matched with the optimum pressurization of the tire 11.

In operation, the lamp 21 will be illuminated only when the pressure within the tire falls below an acceptable level. Thus any casual check of the lamp 21 will indicate the status of the tire 11. Since the apparatus is attached to each tire, all four mounted tires and the spare can be easily checked. When the tire 11 is being filled, the lamp 21 will remain illuminated until optimum pressurization is reached, thus the tire owner no longer needs a gauge and is no longer dependent on guesswork in inflating the tire. Also since the stem 17 and rim 16 are not involved in my apparatus no special care or tools are required to fill or check the tire.

While I have shown my invention is one form, it will be obvious to those skilled in the art that it is not so limited but is susceptible of various changes and modifications without departing from the spirit thereof.

What I claim is:

1. Apparatus for indicating the air pressure in a tubeless automobile tire, or the like, having a sidewall mounted on the wheel rim of a vehicle, comprising:
   (a) a visible indicator mounted on the sidewall of said tire externally of the tire; and
   (b) means for sensing the pressure within said tire mounted on the sidewall of said tire within said tire having an output to actuate said indicator at a predetermined pneumatic pressure.

2. Apparatus as defined in claim 1 wherein said means for sensing comprises a pneumo-mechanical switch having a plurality of electrical contacts which are in an open position or a closed position dependent upon the internal pressure of said tire, and an electrical circuit connecting said switch to said indicator.

3. Apparatus as defined in claim 2 wherein said indicator comprises an apparatus for emitting light responsive to an electric current passing therethrough.

4. Apparatus as defined in claim 2 wherein said pneumo-mechanical switch comprises:
   (a) a resilient casing affixed to the inside of said sidewall, said casing including an axial bore having a first diameter proximal said sidewall and a second larger diameter distal said sidewall;
   (b) a flexible gasket sealingly mounted within said bore in said larger diameter;
   (c) an electrically conductive spring mounted within said bore for biasing said gasket away from said sidewall; and
   (d) an electrical contact member mounted on said gasket, electrically connected to said spring.

5. Apparatus as defined in claim 4 wherein said electrical circuit comprises:
   (a) an electrical battery, having a pair of terminals, supported in said casing in spaced relation to said gasket, such that said electrical contact members can be urged against one of said pair of terminals of said battery by said spring;
   (b) a first electrical conductor connecting said spring to said indicator; and
   (c) a second electrical conductor conecting said battery to said indicator, said first and second electrical conductor passing through said sidewall.

6. Apparatus as defined in claim 5 wherein said indicator is an apparatus for emitting light responsive to an electrical signal therethrough.

7. Apparatus as defined in claim 5 wherein said battery has an aperture therethrough.

8. Apparatus as defined in claim 6 wherein said indicator is mounted in a recess formed in the exterior of said sidewall.

9. Apparatus as defined in claim 1 wherein said indicator is mounted in a recess formed in the exterior of said sidewall.

10. An apparatus for monitoring inflation pressure in a motor vehicle tire comprising:
    (a) means for continuously measuring said inflation pressure mounted directly to said tire on an interior surface thereof, said means for measuring being calibrated to close an electrical circuit when the inflation pressure drops below a pre-determined value; and
    (b) indicator means embedded in an exterior surface of said tire, said indicator means being activated upon closure of said circuit.

11. An apparatus as defined in claim 10 wherein said means for measuring is a pneumo-mechanical switch.

12. An apparatus as defined in claim 11 wherein said pneumomechanical switch comprises:
    (a) a lightweight enclosure having a base affixed to the interior surface of said tire and an open end distal said base;
    (b) a battery sealing said open end, said battery having an air port therein;
    (c) a flexible diaphragm, within said enclosure, said diaphragm being displaced responsive to inflation pressure variations within said tire;
    (d) a metal contact plate mounted on said diaphragm proximal said battery;
    (e) a calibrated biasing spring within said enclosure, said spring urging said diaphragm toward said battery.

* * * * *